United States Patent
Koch et al.

(10) Patent No.: US 6,925,805 B2
(45) Date of Patent: Aug. 9, 2005

(54) TURBOCHARGER

(75) Inventors: Ralf Koch, Ruessingen (DE); Paul Loeffler, Stuttgart (DE); Helmut Daudel, Schorndorf (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/716,279

(22) Filed: Nov. 18, 2003

(65) Prior Publication Data

US 2004/0112052 A1 Jun. 17, 2004

(30) Foreign Application Priority Data

Nov. 18, 2002 (DE) .......................................... 102 53 693

(51) Int. Cl.[7] .......................... F02D 23/00; F01B 25/02
(52) U.S. Cl. .......................... 60/602; 415/150; 415/164
(58) Field of Search .............................. 60/602; 415/159, 415/160, 163, 164

(56) References Cited

U.S. PATENT DOCUMENTS

| | | | | |
|---|---|---|---|---|
| 2,341,974 A | * | 2/1944 | Browne | ...................... 123/163 |
| 3,495,921 A | * | 2/1970 | Swearingen | ................. 415/163 |
| 4,242,040 A | * | 12/1980 | Swearingen | ................. 415/163 |
| 4,300,869 A | * | 11/1981 | Swearingen | ................. 415/164 |
| 4,502,836 A | * | 3/1985 | Swearingen | ................. 415/160 |
| 4,770,603 A | * | 9/1988 | Engels et al. | ............... 415/164 |
| 5,564,895 A | * | 10/1996 | Agahi et al. | ................. 415/164 |
| 5,769,602 A | * | 6/1998 | Agahi et al. | ................. 415/164 |
| 5,851,104 A | * | 12/1998 | Dakin et al. | ................. 416/164 |

* cited by examiner

Primary Examiner—Thai-Ba Trieu
(74) Attorney, Agent, or Firm—Pendorf & Cutliff; Greg Dziegielewski

(57) ABSTRACT

The invention concerns an exhaust gas turbocharger for an internal combustion engine, with at least one turbine arranged in the exhaust gas stream downstream of the internal combustion engine, wherein the turbine includes at least one flow channel with at least one radial flow cross-section, with a nozzle ring bordering the radial flow cross-section, wherein for the variable adjustment of the radial flow cross-section a variable guide vane is provided in this area.

20 Claims, 5 Drawing Sheets

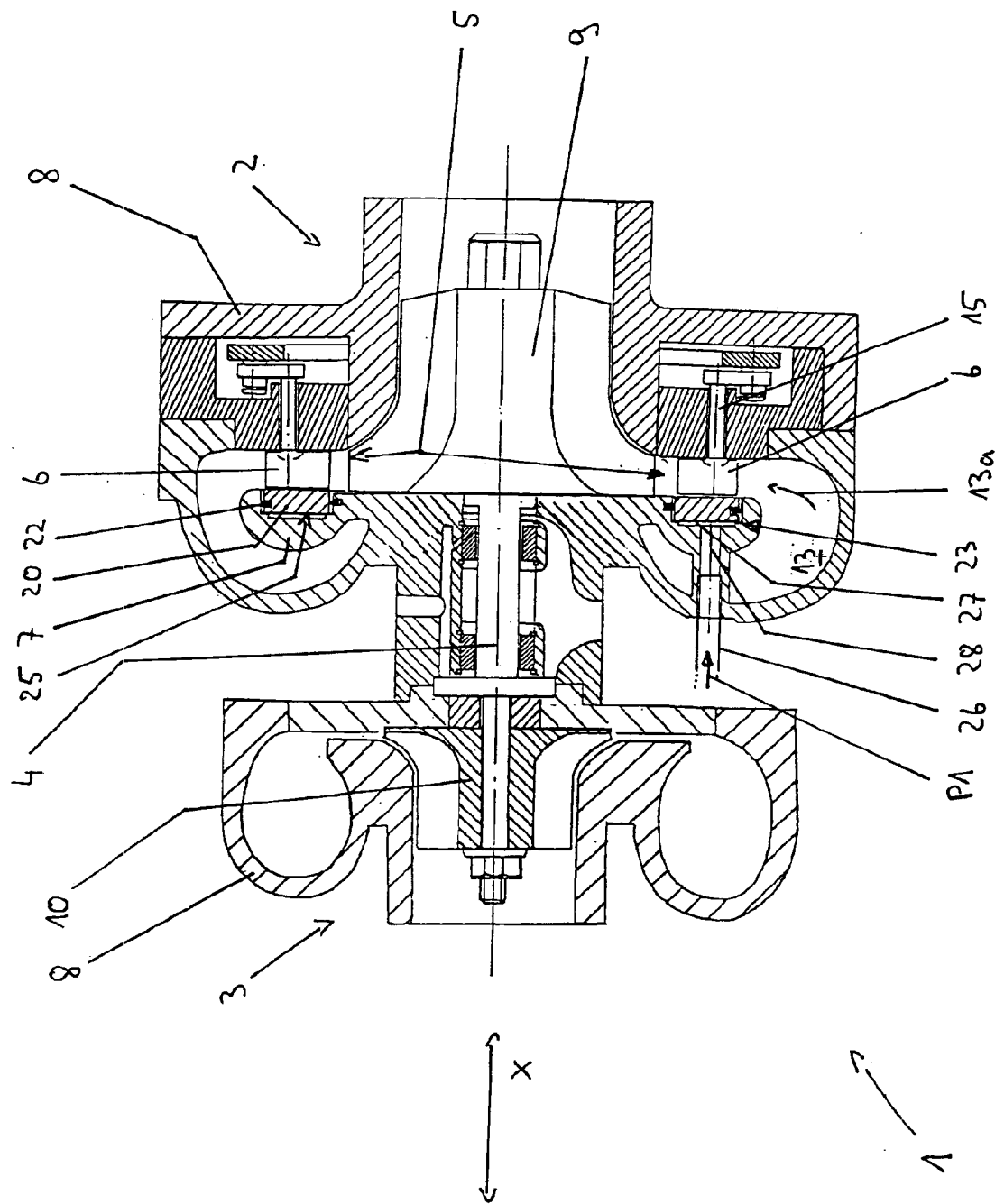

TURBOCHARGER

BACKGROUND OF THE INVENTION

1. Field of the Invention

The invention concerns an exhaust gas turbocharger for an internal combustion engine, that is, an exhaust gas turbocharger for an internal combustion engine, with at least one turbine in the exhaust gas flow downstream of the internal combustion engine, wherein the turbine includes at least one flow channel with a radial flow-inlet cross-section, with a flow ring or nozzle ring bordering the radial flow-inlet cross-section, and wherein a variable guide vane arrangement is provided in this area for varying the radial cross-section.

2. Description of the Related Art

One exhaust gas turbocharger of this type is described for example in German Patent DE 100 29 640 C2. Such an exhaust gas turbocharger will be referred to in the following as a turbocharger with variable turbine geometry (VTG-turbocharger). Additional turbochargers with variable turbine geometry are described in DE 100 48 105 A1, DE 43 30 487 C1 as well as DE 196 15 237 C2.

One VTG-turbocharger known for example from DE 100 29 640 C2 has both a radial flow-inlet cross-section and a semi-axial flow-inlet cross-section, which flow into the turbine segment containing the turbine wheel along a radial or, as the case may be, semi-axial flow entry section. In the flow entry section a flow-optimizing continuous flow ring is provided, which borders and defines the flow entry cross-section in appropriate manner. In the radial flow entry section a guide ring with variable guide vanes is provided, via which the radial flow entry cross-section is varied as desired, so that a variable turbine geometry is provided. Depending upon the actual operating condition of the internal combustion engine, these guide vanes are adjustable between a position restricting free flow of the entry section towards the turbine wheel and a position of wide open flow entry cross-section, whereby the exhaust gas back pressure in the pipe segment between the cylinder outlet and the exhaust gas turbine is manipulated and thus can be adjusted to a desired value. By the adjustment of the guide vanes, it becomes possible to influence the exhaust gas back pressure as well as the mode and manner of the flow of the exhaust gas onto the turbine wheel, whereby the output of the turbine and therewith the output of the compressor can be adjusted as desired depending upon the operating condition of the internal combustion engine. This type of exhaust gas turbine can be used both in the propulsion mode of the internal combustion engine for increasing the motor output as well as in a motor braking operation for providing supplemental motor braking power.

During motor braking the guide vanes are brought to a flow blocking position in order to achieve a high pressure level both on the exhaust gas side as well as on the charge air side for a desired high motor brake power. This occurs by significantly reducing the entry cross-section. The desired high braking power can however only then be achieved, when within the desired pressure distribution exists in the turbine and the exhaust gas flows through the turbine in a pre-determined and precisely controllable manner.

The problem therewith is, in particular, the undesired air bypass (flow-by) between the flow-inlet channel of the turbine and the exhaust side of the turbine, which bypass can occur due to component and manufacturing tolerances, and also due to wear and thermal expansion within the turbine. These undesired bypass air flows occur for example at the large gaps, which can form in the area of the end faces of the radial guide vanes at or opposite their pivotable mounting as a result of thermal or mechanical loads. These bypass flows can strongly interfere with the desired pressure distribution within the turbine, which can have negative consequences both on the motor output in the combustion drive mode however as well as on motor braking power. Bypass flows can occur however also in the gap which is provided during construction as required for the moveability of the guide vanes in one of the flow entry cross-sections.

The problem of undesired flow bypass is of high importance in particular in commercial vehicle motors, which must produce a high motor brake power. There, in particular to avoid bypass flows, a particularly precise fitting mounting of the guide vanes and at the same time reduced thermal and mechanical loading is desired.

In German Patent document DE 100 29 640 C2 an exhaust gas turbocharger of this type is described, in which the positions of the flow ring in the housing of the turbocharger can be variably adjusted. The flow ring, which has the function of limiting the radial or as the case may be the semi-axial flow entry cross-section to a desired value, is here designed to be axially slideable, whereby the otherwise existing guide vane gap in the radial grid may be reduced to a minimal amount.

A problem with the solution described in DE 100 29 640 C2 is that for avoidance or reduction of exhaust flow bypass the entire guide vane ring must be displaced. In particular in commercial vehicles, in which a very high motor brake power is necessary therewith also the motors exhibit a corresponding large size, this flow ring for limiting the radial and semi-axial flow entry cross-section is relatively large. The gap between the variable guide vanes and the flow ring or nozzle ring on the other hand should be as small as possible, ideally in the range of a few tenths to hundredths of millimeters. In practice there exists therewith the problem, of adjusting the relatively large and therewith also massive flow ring in the axial direction defined to a few tenths or hundredths of millimeters of precision. Such a precise adjustability is not possible in practice, or only with substantial complexity. For this in particular a very complex adjustment ring must be provided, with which the complexity is frequently not justified by the use as a supplemental motor brake device.

One such arrangement functions in satisfactorily manner only when no large temperature fluctuations occur. Turbochargers are however subjected to very strong temperature fluctuations due to the flow through of hot exhaust gases, in particular in the case of high power or performance, so that the turbine parts and adjacent parts can heat up to 900° C. These frequent and high temperature oscillations together with the extreme high RPM of the turbine wheel in the compressor wheel produce extreme loads and stresses for all components of the exhaust gas turbocharger, which result in a short life and a loss of function of the turbocharger.

In particular in the case of large motor capacities, including with the arrangement known from DE 100 29 640 C2, a compromise must be made between compensating for a relatively large gap and providing a small as possible gap between guide vanes and nozzle ring. In this case however the employment of an axially displaceable nozzle ring would no longer be justified. In other cases however the nozzle ring as well as the end faces of the guide vanes of the guide arrangement would be subjected to such a substantial frictional wear, that the life of the turbine wheel and therewith the economic feasibility would be significantly reduced. It is however highly desirable to avoid as much as possible reducing the useful life, particularly in the case of turbochargers.

SUMMARY OF THE INVENTION

Beginning with the mentioned state of the art it is thus the task of the present invention to further develop an exhaust gas turbocharger with variable turbine geometry such that it exhibits improved effectiveness. In accordance therewith an exhaust gas turbocharger as known in this art for an internal combustion engine is provided in which however a compensation ring is provided which is designed to be adjustable axially in the direction of the guide vanes. A further task of the invention is comprised therein to improve in particular in the motor braking power during motor braking operation and preferably also charging capacity in the propulsion mode.

It is further a task of the invention to be able to adjust in defined manner the gap between guide vanes and nozzle ring in particular in the case of very large turbine geometries. In particular the life of the turbocharger is to be extended by minimizing the friction wear of guide vanes and nozzle ring.

The present invention is based upon the recognition that for the defined adjustment of the gap between guide vanes and nozzle ring it is not necessary to vary the entire nozzle ring, which in particular in the case of motors with large motor capacity are constructed very massively. Rather, it is sufficient when essentially a compensation ring which, in comparison to the nozzle ring, is very much smaller, is axially displaced.

In comparison to the state of the art the nozzle includes for this purpose in accordance with the invention a compensation ring, which is designed to be slideable axially in the direction of the guide vanes, that is, in the direction of the sides of the guide vanes of the guide vane arrangement. Thereby the possibility is established via a small axial movement of the compensation ring to substantially reduce and in certain cases to completely eliminate gaps which occur due to manufacture or wear or which can occur as a result of thermal expansion or other reasons. Thereby bypass flow can be substantially avoided and a desired pressure distribution can be adjusted within the turbine which brings about a desired exhaust flow upon the turbine wheel.

The invention is particularly suited for exhaust gas turbochargers for commercial vehicles, in which the exhaust gas turbocharger is very massive and in which accordingly the ring of guide vanes must be relatively heavy. While with known solutions the nozzle ring here is adjustable only with substantial use of force, the compensation ring according to the invention is axially adjustable already with relatively small forces.

The invention is however not exclusively limited to very large dimensioned exhaust gas turbochargers in commercial vehicles, but rather can of course also be very advantageously employed in exhaust gas turbochargers in the passenger vehicle area.

The invention is particularly useful in the motor braking operation of the exhaust gas turbocharger. In the motor braking operation it is desired to reduce the radial flow inlet cross-section as far as possible, that is, the radial guide vanes are to be closed. In order however to be able to pivot the radial guide vanes, a minimal gap is necessary at the axial faces of the radial guide vanes. For pivoting the radial guide vanes, the adjustable compensation ring can be displaced axially into a position further from the radial guide vanes. Subsequently, the compensation ring is slid back until contact is made with the sides of the guide vanes or, as the case may be, an other component, for closing the air gap. In the motor braking operation the parts of the guide vanes and the nozzle or as the case may be compensation ring coming into contact with each other are subjected to a stronger frictional wear. As a result of the inventive very small sized compensation ring this wear can be reduced to a minimum.

Advantageous embodiments and further developments of the invention can be seen from the dependent claims as well as the description with reference to the figures.

In a preferred embodiment the compensation ring is provided in a recess in the nozzle ring. It functions therewith to a certain extent as a guide for the axial movement of the compensation ring. Besides this, such an arrangement is very space saving.

In a very useful embodiment the compensation ring includes at least one piston ring, via which the compensation ring is sealed against the nozzle ring. Therewith it is prevented that undesired exhaust gas can pass through the gap between compensation ring and nozzle ring into the internal housing of the exhaust gas turbocharger during operation of the exhaust gas turbocharger, which could result in bypass flow of exhaust gas. Preferably the piston ring is provided on an inner diameter and/or an outer diameter of the compensation ring, however it is of course conceivable that the piston ring is provided in the nozzle ring in a position opposite the compensation ring. It is essentially important therein that the piston ring seals the compensation ring and the nozzle ring against each other. In a preferred embodiment piston rings are embedded in their own grooves within the compensation ring and/or the nozzle ring, whereby a slipping of the piston rings is avoided and therewith a fixation of the piston rings is made possible.

In a very useful embodiment the axial range of movement of the nozzle ring is limited via at least one abutment or stop, preferably via at least two stops, that means respectively one abutment in each direction of movement of the compensation ring.

A first abutment or stop is preferably formed by a recess in the nozzle ring, which therewith limits one movement of the compensation ring against the direction of the guide ring assembly. This first abutment can be formed by a step in the wall area of the nozzle ring. In this step the appropriate surface of the compensation ring abuts there against in the case of a there towards axial movement. Other abutments are of course conceivable, for example spacer casings or springs.

A second abutment is typically formed by the side surfaces of the blades or vanes of the guide vane assembly, whereby an axial movement of the compensation ring in the direction of the guide vane assembly is limited. With this embodiment the compensation ring and guide vanes lie tight against each other during operation, so that no amount of gap is present between compensation ring and guide vane assembly. Thereby bypass flow through the guide vane assembly is substantially avoided. Since this design naturally is associated with friction wear of compensation ring and/or guide vanes, it would also be conceivable, to use as abutments a spacer or the like. These spacers should ideally project substantially slightly beyond the breadth of the guide vanes. This form of the abutment causes however depending upon the dimensions of the spacer a more or less large gap between guide assembly and compensation ring and therewith is associated with more or less large bypass flow through this gap. However, thereby the friction wear of the mentioned elements is substantially reduced, whereby the useful life is significantly extended.

In the case of an axially displaceable compensation ring, the opening of a gap between guide vane assembly and compensation ring is in particular limited to a predetermined amount. A comparatively small amount shall ensure that in a case of disruption, for example in the case of the loss of a control element for adjusting the compensation ring, the maximal play of the compensation ring is limited to a predetermined amount, which shall ensured functioning of the exhaust gas turbocharger both in the motor braking operation as well also in the combustion driven manner.

The compensation ring exhibits in accordance with the invention a smaller outer diameter and/or a larger inner diameter than the nozzle ring. Beyond this it is very useful when the compensation ring exhibits a very much smaller mass than the nozzle ring. This idea of the present invention is based upon the fundamental recognition, that a compensation ring dimensioned with a smaller dimension and mass is much lighter and can be more easily precisely axially adjusted. Particularly in the case of large turbochargers, as are employed for example in commercial vehicles, the compensation ring which in comparison to the nozzle ring is very much smaller and lighter can very easily be axially adjusted against the guide vane assembly, without having to expend therefore a comparatively large force or, as the case may be, larger pressure. Beyond this, in the case of smaller or as the case may be lighter parts it is simpler in the accordance with the invention to seal these against the surrounding housing.

For the axial adjustment of the compensation ring and/or the nozzle ring in accordance with the invention an adjustment mechanism is provided. A pneumatic and/or hydraulic axial adjustment is possible via this adjustment device.

The adjustment device preferably includes a conduit connected with the compensation ring, via which the compensation ring can be acted upon with pressure. Instead of the use of a conduit it would be possible to use a hollow screw, which is screwed into the compensation ring. The axial movement of the compensation ring occurs by action of pressure, wherein the gas or hydraulic pressure necessary therefore is provided by an internal and/or external pressure supply device.

In the case of an internal pressure supply device the pressure necessary for axial displacement can be derived for example from the exhaust gas in the exhaust flow conduit. This internal pressure can be supplied to the compensation ring via a connecting pipeline or as the case may be via a hollow screw.

Preferably, the axial displacement of the compensation ring is self-regulated via internal gas pressure. Therein it is essentially only necessary to note the dimensioning of the connecting pipeline or as the case may be the hollow screw, in particular therein their cross-sections, which are responsible for the determination of the amount of the internal gas pressure.

An external pressure can be provided for example via a pressure supply device 30 provided external to the exhaust gas turbocharger, for example a compressor 30. The compressor 30 produces an internal pressure, which is supplied to the compensation ring via a connecting pipe and/or a hollow screw. In this manner of pressure application there is however a need to solve the requirement of high pressure seals of the pressure supply device 30 (leakage problem).

In a typical arrangement a control device is provided, via which the value of the internal and/or the external gas pressure is controlled depending upon the motor output and/or the desired motor brake power and/or the distance between guide vane arrangement and compensation ring.

In a preferred embodiment the nozzle ring is a component of the housing or as the case may be is rigidly connected with the housing. In the latter case the nozzle ring is connected directly with the housing of the turbocharger via connecting means, for example screws.

Preferably a vane mounting ring is provided, to which the guide vanes of the guide vane arrangement are mounted, wherein the guide vane ring is not secured to the nozzle ring and/or the compensation ring.

In a very preferred embodiment the guide vanes of the guide vane arrangement are designed to be moveable and thereby are mounted on one side on a guide vane ring. The vanes of the guide vane arrangement contact, in the case that no gap exists between guide vanes and compensation ring, essentially only the compensation ring, not the nozzle ring in which the compensation ring is mounted.

In a very preferred embodiment there is the possibility of providing, besides the radial flow entry cross-section, also a semi-axial flow entry cross-section, wherein then the nozzle ring borders or defines the cross-section of the radial as well as the semi-axial flow entry cross-section.

BRIEF DESCRIPTION OF THE DRAWING

The invention will be described in the following in greater detail on the basis of the illustrated embodiment shown in the figures. There is shown:

FIG. 5 a fourth embodiment of an inventive exhaust gas turbocharger with compensation ring.

DETAILED DESCRIPTION OF THE INVENTION

In all the figures the same or functionally same elements and parts—unless otherwise indicated—are referenced with the same reference numbers.

Figure 1:
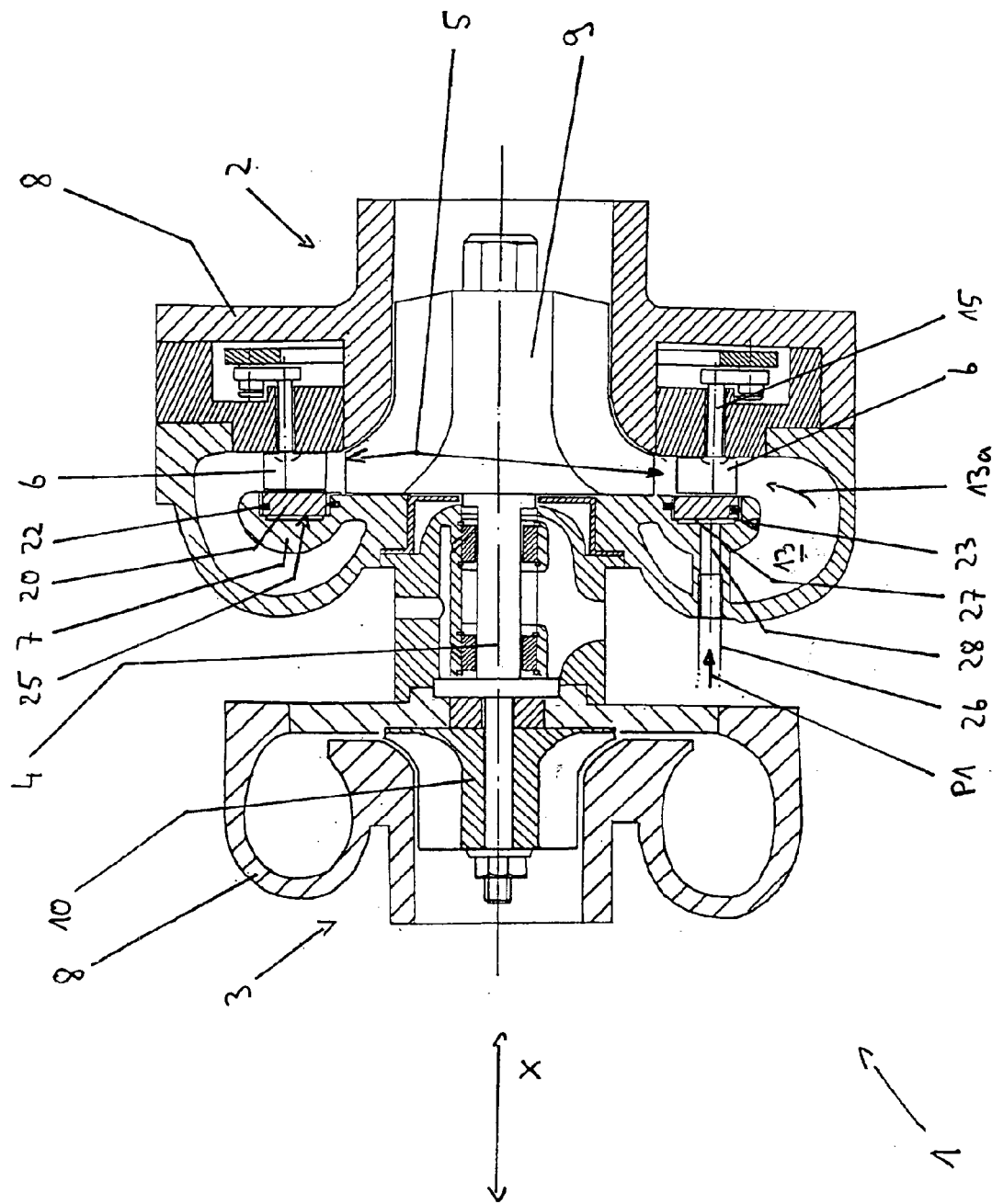
FIG. 1 in sectional representation of a first embodiment of an inventive exhaust gas turbocharger for an internal combustion engine, of which the exhaust gas turbine is equipped radial flow-inlet cross-section area with a variable turbine geometry and includes an inventive axially adjustable compensation ring.

In FIG. 1 an exhaust gas turbocharger for an internal combustion engine is indicated with reference number 1. The internal combustion engine not shown in FIG. 1 can be, for example, a diesel engine or a gasoline engine for a commercial vehicle or a passenger vehicle.

The exhaust gas turbocharger includes a housing 8. In the housing 8 of the exhaust gas turbocharger 1 there is an exhaust gas turbine 2, which in this case is a radial turbine, as well as a compressor 3. The turbine wheel 9 of the radial turbine 2 is rigidly coupled with the compressor wheel 10 of the compressor 3 via a common shaft 4. The compressor wheel 10 is provided in a housing of the compressor 3, the turbine wheel 9 in a housing for the turbine 2. The turbine wheel 9, which is driven by pressurized exhaust gas from the internal combustion engine, drives via the common shaft 4 the compressor wheel 10 of the exhaust gas turbocharger. When the internal combustion engine is operating exhaust gas from the motor is conveyed through a supply channel 13 of the radial turbine 2 and supplied to the turbine wheel 9. The rotational movement thereof is transmitted via the common shaft 4 to the compressor wheel 10, whereupon the compressor 3 on the suction side draws in air, compresses this to an elevated charge pressure and supplies this to the cylinder inlets of the motor.

Further, the turbine 2 includes a flow channel 13 which encompasses the turbine wheel 9 radially. The flow channel 13 includes in the area of the turbine wheel 9 a radial flow inlet cross-section 13a, in which a radial guide vane arrangement 5 with adjustable guide vanes 6 is provided. By this adjustable guide vane arrangement 5 the turbine 2 obtains its variable turbine geometry.

In the following a preferred manner of operation of the turbine with variable turbine geometry will be described on the basis of an example. Depending upon the manner of operation of the internal combustion engine the variable turbine geometry of the guide vane arrangement 5 can be adjusted to various positions by an adjustment mechanism associated therewith, whereby the radial flow inlet cross-section 13a can be varied.

In a preferred embodiment it can be that when the engine is producing exhaust gas the guide blades 6 of the radial guide vane arrangement 5 are set to an open position, in order to make possible a great as possible exhaust gas flow-through stream through the turbine 2 and therewith produce a high charging ability. In contrast, in the motor braking operation, for producing a high motor brake power, the radial guide vane arrangement 5 is, by an appropriate adjustment of the guide vanes 6, adjusted to a blocking position with significantly reduced cross-section, preferably with the radial flow-through entry cross-section 13a reduced to zero. The exhaust gas provided via the flow channel 13 from the exhaust gas outlet of the internal combustion engine is thus to flow forced, substantially or completely, through the semi-axial flow entry cross-section 13b and the there located semi-axial guide vane arrangement 14 onto the turbine wheel 2. On the basis of the reduced flow total cross-section in comparison to the propulsion operation of the engine, there results a build up in the exhaust gas line in the area between the turbine and motor and a high exhaust gas pressure. This exhaust gas pressure brings about that the exhaust gas flows with high velocity through the channel between the guide vanes and thus the turbine wheel is acted upon with high impulse. By the increased charger output the fresh air for combustion supplied to the motor is also placed under increased charge pressure. The cylinder is acted upon on the charge air side with an increased charge pressure. At the same time however at the exhaust gas side an increased exhaust gas pressure exists, which helps to blow off the compressed exhaust gas remaining in the cylinder through the brake valve into the exhaust gas pipe. In this motor brake operation the piston must carry out compression work against the elevated pressure in the exhaust gas line, that means, the air compressed in the cylinders must be pushed against the elevated exhaust gas pressure in the exhaust gas line, from which the desired supplemental brake power is produced.

The adjustable guide vanes 6 of the radial guide vane arrangement 5 are mounted to be rotatably about shafts 15. In the illustrated embodiment in FIG. 1 the shafts 15 are essentially mounted on one side, and this namely in the area of the guide vane ring in which the guide vanes of the guide vane arrangement are arranged. Also conceivable is a two-sided mounting, wherein the shafts 15 of the guide vanes 6 are mounted both in the guide vane ring as well as in the nozzle ring.

In the flow-through channel 13 of the turbine 1 there is provided a nozzle ring 7 which borders the radial flow through cross-section 13a.

In accordance with the invention a compensation ring 20 is provided. The compensation ring is located in a recess in the nozzle ring 7 provided specifically therefore. Via a sealing element 22, for example, a piston ring, the compensation ring 20 is sealed against the recess 21 and therewith against the nozzle ring 7. This sealing element 22 is comprised in the present illustrated embodiment of two sealing elements 22 which are provided on the inner diameter and the outer diameter of the compensation ring 20. These sealing elements 22 establish in operation in the ideal case a tight connection between compensation ring 20 and nozzle ring 7, so that it is always ensured that only a small amount of exhaust gas can enter into the area between nozzle ring 7 and compensation ring 20.

Figure 2:
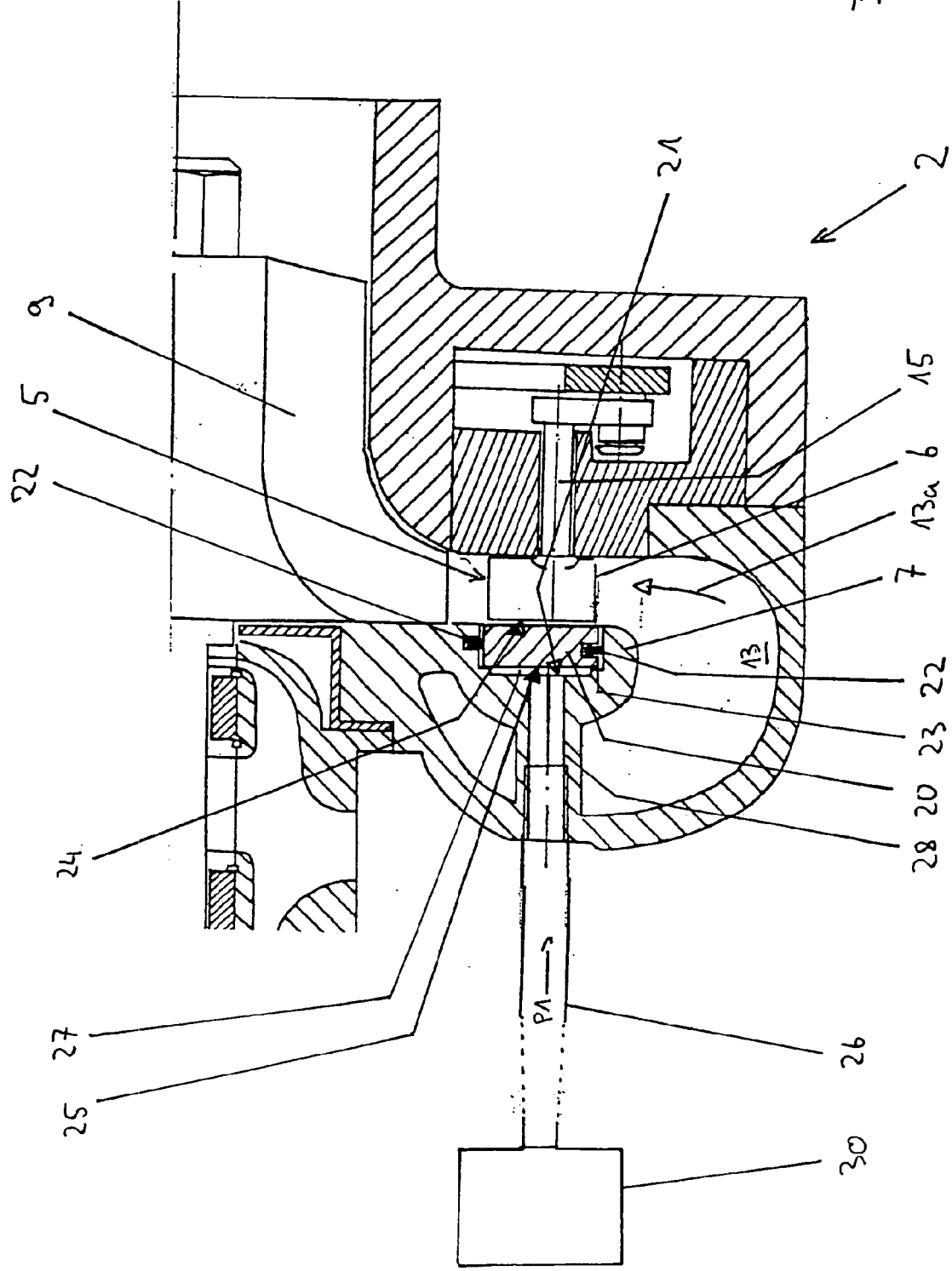
FIG. 2 a sectional representation of the turbine area containing the inventive compensation ring.

FIG. 2 shows in an enlarged representation the arrangement of the inventive compensation ring 20 within the nozzle ring 7 or as the case may be the turbine 2.

In accordance with the invention the compensation ring 20 is designed to be moveable in the axial direction X. This means, that the compensation ring 20 is designed to be displaceable back and forth in the axial direction X of the turbine 2, that is, in the direction of the guide vane assembly 5.

The compensation ring 20 is however not freely moveable in the axial direction X and within the recess 21. Rather, the axial movement of the compensation ring 20 is limited by fixed or substantially fixed abutments or stops 23, 24. On the side of the nozzle ring 7 one such stop 23 is provided in the recess 21 of the nozzle ring 7. The stop 23 is here in the form of a step in the housing wall of the nozzle ring 7. On the side of the guide vane assembly 5 the side surface of the guide vanes 6 respectively form the opposite stop 24. By the two stops 23, 24 the range of axial movement of the compensation ring 20 is therewith defined.

In the present embodiment the compensation ring 20 lies axially tight against the sides of the radial guide vane assembly 5 forming the second stop 24, so that no gap exists between the guide vane assembly 5 and compensation ring 20. Thereby radial bypass flows can be substantial prevent.

Instead of using the guide vanes 6 as stop 24 it is also possible to provide distance maintaining elements or spacers, which limit the axial displacement of the compensation ring 20 in the direction of the radial guide vane assembly 5. The use of spacers as stops is not described in the illustrated embodiments.

The radial displacement of the compensation ring 20 occurs via gas pressure P1 which acts upon the face 25 of the compensation ring 20 opposite to the side facing the guide vane assembly. The gas pressure P1 is provided via an external pressure supply device not shown in greater detail in FIGS. 1 and 2 and is conveyed along a pipeline 26 into the chamber 27 between the compensation ring 20 and the nozzle ring 7. The pipeline 26 is in the present illustrated embodiment a component of the housing 8 as well as the nozzle ring 7. However, it would also be conceivable to use for this a separate designated connecting pipeline. The pipeline 26 can of course also be a high-pressure screw, which is connected via a suitable screw connection with the housing or as the case may be the nozzle ring 7. Via the pipeline 26 the surface 25 is acted upon with an externally provided gas pressure P1. By suitable selection of the gas pressure P1 it becomes possible to adjust as desired therewith the compensation ring 20 in the axial direction X.

Figure 3:
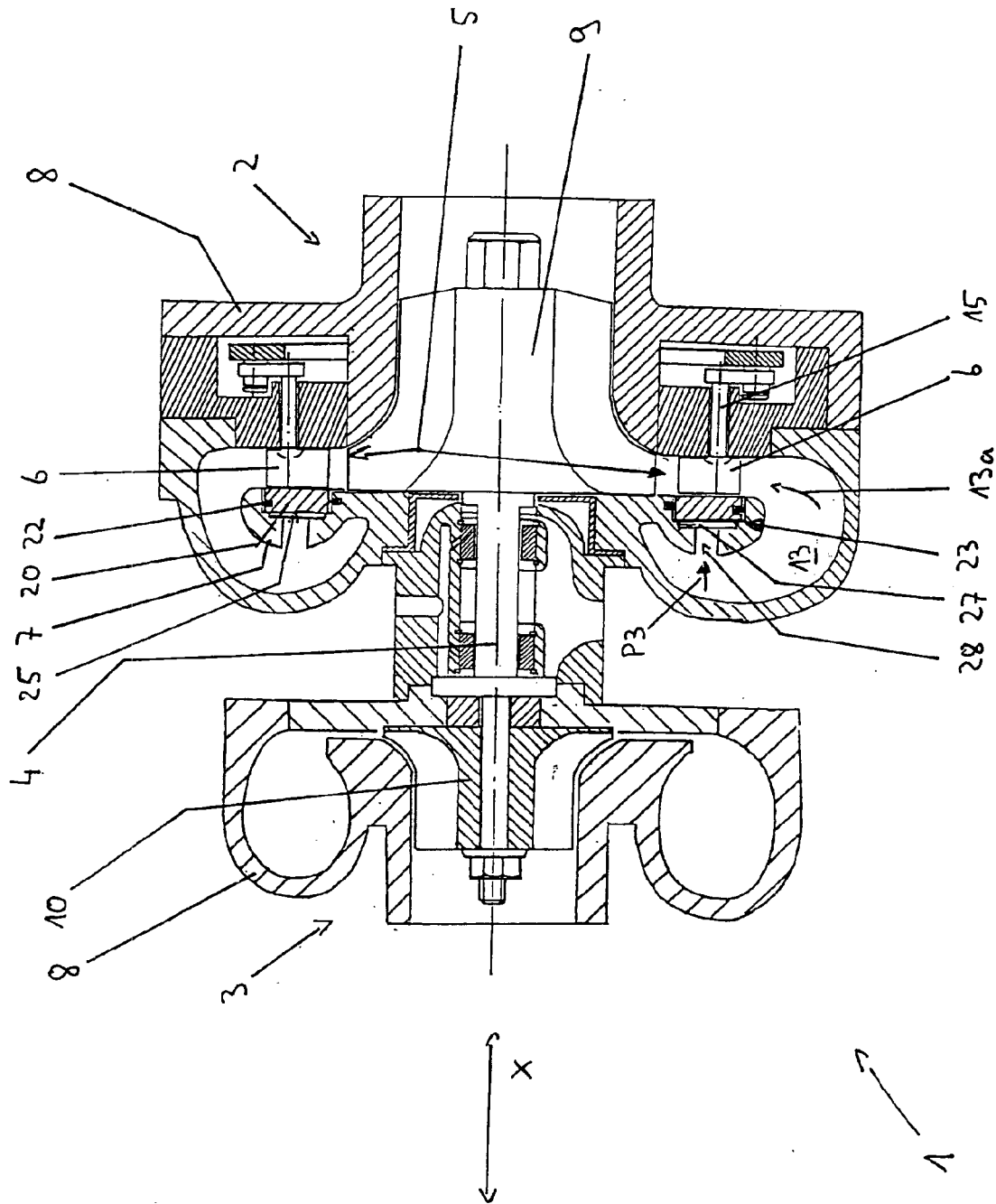
FIG. 3 a second illustrative embodiment of an inventive exhaust gas turbocharger with compensation ring.

In contrast to FIG. 1, in the illustrated embodiment in FIG. 3 the compensation ring 20 is acted upon with an internally provided gas pressure P3. For this no pipeline 26 is provided, however the nozzle ring 7 exhibits a bore, via which the flow channel 13 is connected with the chamber 27 and therewith the surface 25 of the compensation ring 20. The surface 25 is acted upon with the internal gas pressure P3. The internal gas pressure P3 results however from pressure P3, which results from the exhaust gas flow in the flow channel 13. If this pressure P3 is very large, then the compensation ring 20 is pushed more strongly in the axial direction X, while in the case of a smaller pressure P3 it is pushed less in the axial direction X. There is thus produced therewith a self-regulating displacement of the compensation ring 20 within the nozzle ring 7. Therewith it is essentially only necessary to select the diameter of the bore 28 within the nozzle ring 7.

Figure 4:
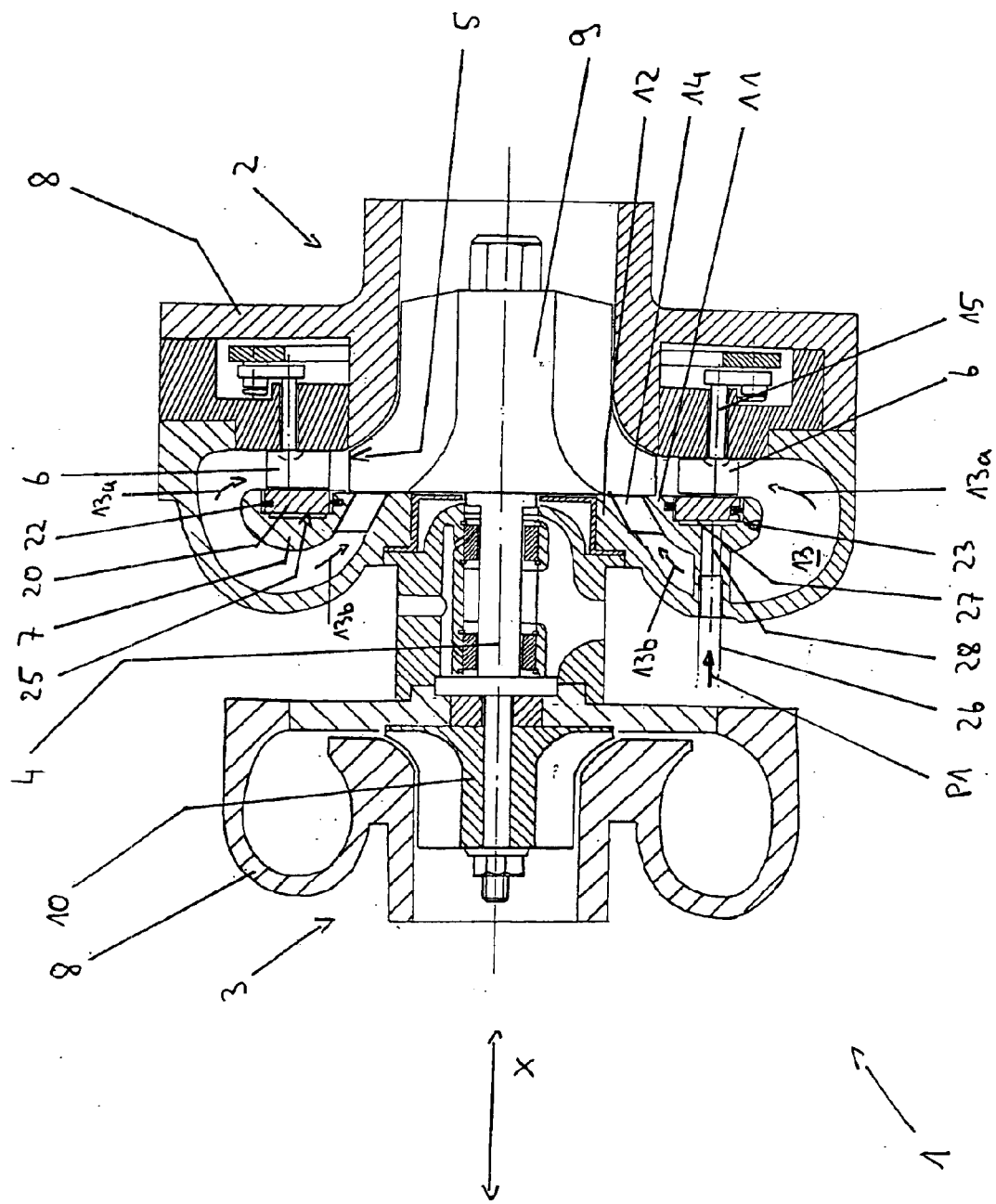
FIG. 4 a third illustrative embodiment of an inventive exhaust gas turbocharger with compensation ring.

In contrast to the embodiment in FIG. 1 the exhaust gas turbocharger 1 or as the case may be the turbine 2 in FIG. 4 includes a flow channel 13 which encompasses or surrounds the turbine wheel 9 both radially as well as semi-axially. The nozzle ring 7 includes an external ring 11 and an internal ring 12. The flow-through channel 13 exhibits in the area of the turbine wheel 9 both a radial flow entry cross-section 13a as well as a semi-axial flow entry cross-section 13b. Between outer ring 11 and inner ring 12 here the semi-axial guide vane assembly 14 with fixed guide vanes is rigidly connected to the nozzle ring 7.

In contrast to FIG. 1 the nozzle ring 7 in the embodiment in FIG. 5 is a component of the housing 8, that means, there exists here no gap between housing 8 and nozzle ring 7.

It can however be advantageous, in certain operating conditions of the internal combustion engine in the motor braking operation and/or in the power producing propulsion mode of operation, to provide a desired amount of gap, with which the flow and pressure relationships within the charger housing in the turbine can be influenced targetedly in a determined manner. Besides this it can be useful to provide supplemental criteria for the adjustment of the compensation ring 20, for example in the manner that the flow entry cross-section 13a, 13b for the radial and/or semi-axial flow may never exceed a maximum.

The compensation ring 20 is—as already mentioned—designed to be axially displaceable, whereby in particular guide vane gaps at the radial guide vane assembly 5 can be reduced. Alternatively or as supplementally it can however also be useful to provide a radial displaceability of the compensation ring 20, which can be accomplished by an eccentric displacement of the compensation ring 20. Besides the axial displaceability of the compensation ring 20 it can also be useful in certain applications to supplementally displace the nozzle ring 7 axially and/or radially.

In summary it can be concluded that, by the above described designed turbocharger, in very simple manner, however nevertheless a very effective manner, an increased degree of effectiveness as well as a smaller wear of the exhaust gas turbine in comparison to solutions according to the state of the art are accomplished, without however having to provide a complex and expensive solution.

The present invention was described on the basis of the above description in such a manner that the principle of the invention and the practical applications are explained as well as possible, however the inventive arrangement can of course be realized in other embodiments by appropriate modifications.

REFERENCE NUMBER LIST 1 exhaust gas turbocharger
2 turbine, radial turbine
3 compressor
4 common shaft
5 (radial) guide vane assembly
6 guide vanes
7 nozzle ring
8 housing
9 turbine wheel
10 compressor wheel
11 outer ring
12 inner ring
13 flow channel
13a radial flow entry cross-section
13b semi-axial flow entry cross-section
14 semi-axial guide vane
15 shaft bearing of the radial guide vanes
20 compensation ring
21 recess
22 sealing element, piston ring
23 stop
24 stop
25 surface of the compensation ring
26 pipeline
27 chamber
28 hollow screw, bore
30 external pressure supply device, compressor
X axial direction
P1 external pressure
P3 internal pressure

What is claimed is:

1. An exhaust gas turbocharger for an internal combustion engine, comprising at least one turbine adapted for receiving exhaust gas flow from the internal combustion engine, wherein the turbine (2) comprises:
   a flow channel (13) with at least one radial in-flow cross-section (13a) between opposite sides,
   a nozzle ring (7) bordering the radial in-flow cross-section (13a),
   a guide vane assembly (5) which is variably adjustable for adjusting the radial flow-through cross-section (13a), and
   a compensation ring (20) mounted to the nozzle ring and displaceable axially from the nozzle ring towards the guide vane (5),
   wherein the guide vane assembly is mounted on one side of the flow channel (13) and the compensation ring (20) is mounted on the opposite side of the flow channel (13).

2. An exhaust gas turbocharger according to claim 1, wherein the compensation ring (20) is provided in a recess (21) of the nozzle ring (7).

3. An exhaust gas turbocharger according to claim 1, wherein at least one sealing element (22) is provided on an internal diameter and/or on an outer diameter of the compensation ring (20), via which the compensation ring (20) is sealed against the nozzle ring (7).

4. An exhaust gas turbocharger according to claim 1, wherein the axial moveability of the nozzle ring (7) is defined by at least one abutment or stop (23, 24).

5. An exhaust gas turbocharger according to claim 4, wherein a first stop (23, 24) is formed by a recess (21) in the nozzle ring (7), whereby the travel of the compensation ring (20) in a first direction is limited.

6. An exhaust gas turbocharger according to claim 4, wherein a second stop (23, 24) is formed by the surface of the guide vanes (5), whereby a movement of the compensation ring (20) in a second direction opposite to the first direction is limited.

7. An exhaust gas turbocharger according to claim 1, wherein a space exists between the guide vane assembly (5) and the compensation ring (20), which upon maximal extension of the compensation ring (20) lies in the range of at a few tenths of millimeters.

8. An exhaust gas turbocharger according to claim 1, wherein the compensation ring (20) exhibits a smaller outer diameter and/or a larger inner diameter and/or a smaller weight than the nozzle ring (7).

9. An exhaust gas turbocharger according to claim 1, wherein an actuation mechanism (26, 27, 28) is provided, via which the compensation ring (20) and/or the nozzle ring (7) is pneumatically or hydraulically axially displaceable.

10. An exhaust gas turbocharger according to claim 9, wherein the actuation mechanism (26, 28) includes a pipeline (26) and/or a hollow screw (28) connected with the compensation ring (20), via which the compensation ring (20) is acted upon by pressure (P1, P3).

11. An exhaust gas turbocharger according to claim 1, wherein an internal pressure supply device is provided, which provides an internal gas pressure (P3) from the exhaust gas flow in the flow channel (13), which is supplied in particular via a pipeline (26) and/or a hollow screw (28) to the compensation ring (20).

12. An exhaust gas turbocharger according to claim 11, wherein the determination of the amount of the internal gas pressure (P3) is self regulating based on the exhaust gas flow in the flow channel (13).

13. An exhaust gas turbocharger according to claim 1, wherein an external pressure supply device (26, 28, 30) is provided on the exhaust gas turbocharger (1), which provides an external gas pressure (P1), which is supplied to the compensation ring (20) via a pipeline (26) and/or a hollow screw (28).

14. An exhaust gas turbocharger according to claim 11, wherein a control device is provided, by means of which the amount of the gas pressure (P1, P3) is controlled depending upon the motor output and/or by the desired motor brake power and/or the distance between the guide vane assembly (5) and compensation ring (20).

15. An exhaust gas turbocharger according to claim 1, wherein the compensation ring (20) is coupled rigidly with the nozzle ring (7) or is a component of the nozzle ring (7).

16. An exhaust gas turbocharger according to claim 1, wherein the nozzle ring (7) is a component of the housing of the exhaust gas turbocharger (1).

17. An exhaust gas turbocharger according to claim 1, wherein the nozzle ring (7) is connected directly with the housing of the exhaust gas turbocharger (1) by means of securing elements, in particular by means of screws.

18. An exhaust gas turbocharger according to claim 1, wherein the moveable guide vanes (6) of the guide vane assembly (5) are mounted one-sidedly on the vane ring and essentially contact only the compensation ring (20), however the moveable guide vanes (6) of the guide vane assembly (5) do not contact the nozzle ring (7).

19. An exhaust gas turbocharger according to claim 1, wherein besides the radial flow cross-section (13*a*) also a semi-axial flow cross-section (13*b*) is provided, wherein the nozzle ring (7) defines the effective cross-section of the radial and the semi-axial flow cross-section (13*a*, 13*b*).

20. An exhaust gas turbocharger for an internal combustion engine, comprising at least one turbine adapted for receiving exhaust gas flow from the internal combustion engine, wherein the turbine (2) comprises:

a flow channel (13) with at least one radial in-flow cross-section (13*a*), a nozzle ring (7) bordering the radial in-flow cross-section (13*a*), a guide vane assembly (5) which is variably adjustable for adjusting the radial flow-through cross-section (13*a*), and a compensation ring (20) displaceable axially from the nozzle ring towards the guide vane (5), wherein a vane ring is provided, upon which the guide vanes (6) of the guide vane assembly (5) are mounted, wherein the guide vane (6) is not connected to the nozzle ring (7) and/or the compensation ring (20).

* * * * *